US011444693B2

(12) United States Patent
Maho et al.

(10) Patent No.: US 11,444,693 B2
(45) Date of Patent: Sep. 13, 2022

(54) FREE SPACE OPTICAL FSO SPACE DATA TRANSMISSION SYSTEM IN THE INFRARED WAVELENGTH DOMAIN

(71) Applicant: THALES, Courbevoie (FR)

(72) Inventors: Anaëlle Maho, Toulouse (FR); Michel Sotom, Toulouse (FR); Alexandre Delga, Palaiseau (FR); Mickaël Faugeron, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/121,508

(22) Filed: Dec. 14, 2020

(65) Prior Publication Data

US 2021/0194583 A1 Jun. 24, 2021

(30) Foreign Application Priority Data

Dec. 20, 2019 (FR) ...................................... 1915154

(51) Int. Cl.
*H04B 10/118* (2013.01)

(52) U.S. Cl.
CPC .................. *H04B 10/118* (2013.01)

(58) Field of Classification Search
None
See application file for complete search history.

(56) References Cited

U.S. PATENT DOCUMENTS

| | | | | |
|---|---|---|---|---|
| 5,062,150 A | * | 10/1991 | Swanson ................ | H04B 10/11 398/129 |
| 7,424,225 B1 | * | 9/2008 | Elliott .................... | H04W 4/02 398/115 |
| 10,225,006 B1 | * | 3/2019 | Ulander ................ | H04B 10/11 |
| 10,707,961 B2 | * | 7/2020 | Turner ................... | H04B 7/195 |

(Continued)

FOREIGN PATENT DOCUMENTS

| | | |
|---|---|---|
| EP | 3 128 683 A1 | 2/2017 |
| WO | 00/14902 A2 | 3/2000 |

(Continued)

OTHER PUBLICATIONS

Hood, D. Gigabit-capable Passive Optical Networks, 2012 (Year: 2012).*

(Continued)

*Primary Examiner* — Jai M Lee
(74) *Attorney, Agent, or Firm* — BakerHostetler (57) ABSTRACT

A free space optical FSO space data transmission system includes a first ground or aeronautical optical terminal, a second optical terminal housed on board a satellite, and a relay platform. The relay platform is configured so as to move at an altitude higher than that of clouds and atmospheric turbulence, so as to receive the data transmitted by the first terminal in the MWIR/LWIR domain of long wave infrared LWIR wavelengths and/or medium wave infrared MWIR wavelengths, and retransmit the received data to the second terminal in the domain of short wave infrared SWIR wavelengths, and/or receive the data transmitted by the (Continued)

second terminal in the domain of short wave infrared SWIR wavelengths, and retransmit the received data to the first terminal in the MWIR/LWIR domain of long wave infrared LWIR wavelengths and/or medium wave infrared MWIR wavelengths.

17 Claims, 4 Drawing Sheets

(56) References Cited

U.S. PATENT DOCUMENTS

| | | | |
|---|---|---|---|
| 2002/0114044 A1* | 8/2002 | Chiou | H04B 10/1125 398/121 |
| 2002/0167702 A1* | 11/2002 | Badesha | B64G 5/00 398/121 |
| 2003/0108292 A1* | 6/2003 | Abe | G02B 6/2931 385/37 |
| 2004/0109692 A1* | 6/2004 | Plante | H04B 10/1125 398/118 |
| 2006/0127100 A1* | 6/2006 | Frankel | H04B 10/29 398/158 |
| 2013/0177322 A1 | 7/2013 | Devaul et al. | |
| 2013/0182620 A1* | 7/2013 | Chaffee | H04B 10/503 370/310 |
| 2013/0315604 A1* | 11/2013 | LoPresti | H04B 10/271 398/116 |
| 2016/0204866 A1* | 7/2016 | Boroson | H04B 10/61 398/97 |
| 2016/0285541 A1* | 9/2016 | Liu | H04B 10/503 |
| 2017/0214462 A1* | 7/2017 | Busche | H04B 10/29 |
| 2017/0346563 A1* | 11/2017 | Steinkraus | H04B 10/118 |
| 2017/0366263 A1* | 12/2017 | Turgeon | H04B 7/1858 |
| 2020/0119805 A1* | 4/2020 | Miyakawa | H04B 10/1129 |
| 2020/0119811 A1* | 4/2020 | Kay | H04B 10/118 |
| 2021/0075517 A1* | 3/2021 | Matsuda | H04B 10/112 |

FOREIGN PATENT DOCUMENTS

| | | |
|---|---|---|
| WO | 2016/112286 A1 | 7/2016 |
| WO | 2018/103926 A1 | 6/2018 |

OTHER PUBLICATIONS

Wikipedia, Quantum cascade laser, 2018 (Year: 2018).*
Zhang et al., Fiber-based free-space optical coherent receiver with vibration compensation mechanism, 2013, OSA (Year: 2013).*
Wikipedia, Quantum well infrared photodetector, Mar. 2019 (Year: 2019).*
Abou-Rjeily, Chadi, All-Active and Selective FSO Relaying: Do We Need Inter-Relay Cooperation?. 2014, IEEE (Year: 2014).*
Plank et al., "Recent developments on the free space optical links and wavelength analysis", International Conference on Space Optical Systems and Applications (ICSOS), pp. 14-20, 2011.
Leitgeb et al., "Analysis and evaluation of optimum wavelengths for free-space optical transceivers", ICTON 2010.
Hamza, et al., "Classification Framework for Free Space Optical Communication Links and Systems", IEEE Communications Surveys & Tutorials, vol. 21, Issue: 2, pp. 1346-1382, Apr. 1, 2019.

* cited by examiner

FREE SPACE OPTICAL FSO SPACE DATA TRANSMISSION SYSTEM IN THE INFRARED WAVELENGTH DOMAIN

CROSS-REFERENCE TO RELATED APPLICATIONS

This application claims priority to foreign French patent application No. FR 1915154, filed on Dec. 20, 2019, the disclosure of which is incorporated by reference in its entirety.

FIELD OF THE INVENTION

The present invention relates to a free space optical (FSO) space data transmission system in the infrared wavelength domain, configured so as to transmit:

high-throughput uplink data, transmitted by a first ground or aeronautical terminal, located in an atmospheric environment, to a second space terminal, located in space around the Earth, the high-throughput uplink data being liable to be subjected to interference by clouds and/or atmospheric turbulence at a certain altitude and/or high-throughput downlink data, transmitted by the second space terminal, located in space, to the first ground or aeronautical terminal, the high-throughput downlink data being liable to be subjected to interference by clouds and/or atmospheric turbulence at a certain altitude.

The present invention also relates to a relay platform for retransmitting the uplink data from the first terminal to the second terminal and/or retransmitting the downlink data from the second terminal to the first terminal, and reducing the attenuation of the high-throughput data caused by interference, created by clouds and atmospheric turbulence, interposed between the first terminal and the second terminal.

BACKGROUND

Generally speaking, the distance between a first terminal and a second terminal is significant, equal to at least 200 kilometres, and possibly reaching several hundred or even several thousand or tens of thousands of kilometres. This distance defines the minimum length of the optical link.

By definition, a first terminal is a "ground" or "aeronautical" optical data transmission terminal. The first terminal is called "ground" terminal if it is located on the ground, and "aeronautical" terminal if it is located in the atmosphere, possibly being static or mobile.

By definition, a second terminal is a space high-throughput optical data transmission terminal, located outside the atmosphere, and housed on board a satellite moving over an orbit contained within the set of geostationary orbits (GSO), medium Earth orbits (MEO) and low Earth orbits (LEO).

The invention preferably targets free space optical (FSO) space data transmission applications between a first ground transmission terminal, i.e. located on the ground, and a second space transmission terminal, i.e. housed on board a satellite.

More broadly, the invention also relates to free space optical space data transmission applications between a first aeronautical transmission terminal, i.e. located in the atmosphere and moving above the ground, and a second space transmission terminal, i.e. housed on board a satellite.

Long-distance free space optical communications are commonly defined with wavelengths, in the near infrared by wavelengths in the short wave infrared (SWIR) wavelength domain of between 1 µm and 3 µm, and in the far infrared by wavelengths in the long wave infrared (LWIR) wavelength domain of between 8 µm and 12 µm and/or wavelengths in the medium wave infrared (MWIR) wavelength domain of between 3 µm and 5 µm.

As is known and independently of the wavelength domain that is used (LWIR or SWIR), the propagation of an optical signal, in combination with transmission of high-throughput data in free space optics FSO, is hampered by atmospheric interference on the transmission channel, the atmospheric interference being contained in the set formed by turbulence and aerosols.

As first type of interference, dense clouds, severe fog and various aerosols lead, through various scattering phenomena, notably Rayleigh and Mie phenomena, to attenuations in the signal that are all the greater when the droplets of water or other liquids have a size comparable to that of the optical wavelengths that are used, and possibly exceeding 30 dB per kilometre.

As second type of major interference experienced by free space optical FSO links, scintillation, due to fluctuations in the refractive index of the atmosphere, results, at the transmission receiver, in fluctuating attenuations of the collected signal, a loss of alignment and of coupling efficiency at the receiver, and a loss of mixing efficiency in the case of a homodyne or heterodyne receiver.

Thus, scattering and scintillation greatly degrade the transmission performance for the signal and act directly on the link budget.

These two predominant interference phenomena attenuate the signal and cause it to fade, leading to random deflections of the propagation direction and to "dispersion" of the beam, and overall degrade the transmission performance.

When there is excessive cloud coverage, the minimum performance required for successful transmission is not able to be achieved, and the link may be blocked.

To date, only civilian free space optical FSO long-distance space communication systems using wavelengths located in the near infrared SWIR domain are produced and used.

As described in the article by T. Planck et al., entitled "Recent developments on the free space optical links and wavelength analysis", published in International Conference on Space Optical Systems and Applications (ICSOS) Santa Monica, C A 2011, forming a first document, and as described in the article by E. Leitgeb et al., entitled "Analysis and evaluation of optimum wavelengths for free-space optical transceivers", published in ICTON 2010, forming a second document, it is known that using wavelengths located in the long wave infrared LWIR wavelength domain, including for space applications, makes it possible to reduce the effects of Mie and Rayleigh scattering and the scintillation effects experienced by a free space optical FSO long-distance communication signal.

Numerous solutions are known in order to overcome the problem of unavailability, created by atmospheric interference, on a free space FSO transmission link between a first and a second terminal.

A first solution consists in implementing geographical diversity by deploying at least two first optical transmission terminals at various geographical locations, spaced far enough from one another to ensure availability of the FSO optical link with respect to at least one terminal. This solution is expensive and burdensome for the transmission system due to the duplication of the first terminals. Moreover, in addition to meeting demanding weather criteria, the first terminals have to be located close to the core networks and in authorized geographical regions.

A second known solution for overcoming the unavailability of the FSO optical link is to replace the FSO optical link with high-frequency RF radiofrequency links. However, the desired increase in the throughputs for the data to be transmitted means having to consider frequency bands that are always higher for these links, which are also sensitive to atmospheric interference. In addition to being heavy, bulky and consuming more, these RF technologies also have the drawback of being regulated by standards and licences, which are constrictive and expensive. Lastly, using hybrid FSO/RF solutions does not make it possible to capitalize on the advantages of FSO solutions in terms of transmission capacity, mass and consumption, since they mean having to house the two types of terminal on a satellite.

It should be noted that, in order to attenuate the effects of fading caused by atmospheric turbulence, a third solution is that of resorting to digital techniques such as interlacing and error correction codes. By separating and/or repeating the packets, they make it possible to limit errors caused by losses during strong attenuation. However, these digital techniques correct only minor interference or brief fading, and do not correct strong and/or prolonged attenuation.

It should also be noted that other known solutions make it possible to correct the effects of scintillation, deflection and broadening of the optical beam, notably adaptive optical systems and multi-aperture optical systems. However, these methods are complex to implement, do not correct strong atmospheric attenuation and remain limited to certain application cases.

The technical problem is that of improving the transmission performance in terms of throughput and availability of a space data transmission system between a first ground or aeronautical terminal and a second space terminal, separated from one another by at least two hundred or even up to several thousand kilometres, and of reducing the attenuation of the optical signal caused by interference on the transmission channel, defined between the first terminal and the second terminal, this interference being caused by atmospheric turbulence, without increasing the complexity of the first and second terminals.

SUMMARY OF THE INVENTION

To this end, one subject of the invention is a free space optical FSO space data transmission system comprising: a first ground or aeronautical free space optical FSO data transmission terminal; a second free space optical FSO data transmission terminal housed on board a satellite; a relay platform, located between the first transmission terminal and the second transmission terminal, and configured so as to serve as a regenerator relay for transmitting data between a first uplink transmission link from the first terminal to the relay platform, and a second uplink data transmission link from the relay platform to the second transmission terminal, and/or between a third downlink transmission link from the second terminal to the relay platform, and a fourth downlink transmission link from the relay platform to the first terminal.

The free space optical FSO space data transmission system is characterized in that the relay platform is configured so as to move at an altitude higher than that of clouds and atmospheric turbulence, and the relay platform is configured so as to:

receive the data transmitted by the first terminal, carried by a first optical signal on the first uplink that uses a first wavelength in the MWIR/LWIR domain of long wave infrared LWIR wavelengths, between 8 and 12 µm and/or medium wave MWIR wavelengths, between 3 and 5 µm, and transmit the received data on a second optical signal carrying the second uplink that uses a second wavelength in the domain of short wave infrared SWIR wavelengths; and/or receive the data transmitted by the second terminal, carried by a third optical signal on the third downlink that uses a third wavelength in the domain of short wave infrared SWIR wavelengths, and transmit the received data on a fourth optical signal carrying the fourth downlink that uses a fourth wavelength in the MWIR/LWIR domain of long wave infrared LWIR wavelengths and/or medium wave MWIR wavelengths.

According to some particular embodiments, the free space optical FSO space data transmission system comprises one or more of the following features, taken alone or in combination:

the altitude of the relay platform is in the stratosphere or beyond; and/or the relay platform is a dirigible or a drone moving in the stratosphere or a satellite moving over a low Earth orbit LEO;

the first ground or aeronautical terminal is contained in the set formed by ground stations, ships, and aircraft such as drones, planes and helicopters; the second space terminal is housed on board a satellite moving over a geostationary orbit GEO or a medium-altitude orbit MEO or a low-altitude orbit LEO;

the relay platform comprises a first uplink conversion chain having an uplink reception chain, configured so as to receive, in the MWIR/LWIR domain, the first optical signal on the first uplink, optionally amplify and/or optionally wavelength-demultiplex the received first optical signal, detect and demodulate the amplified and demultiplexed signal into demodulated data; an uplink transmission chain, configured so as to transmit, optionally amplify, and/or optionally multiplex, in the SWIR domain, the second optical signal on the second uplink, modulated by the demodulated data on the first uplink, coded or without interlacing or uncoded;

the uplink reception chain comprises a first telescope at the reception end of the first uplink, an uplink demodulation chain with coherent detection using a heterodyne or homodyne beat comprising a local oscillator and a 90° hybrid followed by an assembly of at least one photodetector contained in the set of QWIP quantum-well photodetectors, QCD quantum-well photodetectors, and photodetectors using materials from the set of materials MCT, HgCdTe (mercury cadmium telluride) and T2SL (InAs/Ga type-II superlattice);

the uplink reception chain furthermore comprises a low-noise semiconductor optical preamplifier SOA and/or a wavelength demultiplexer in the MWIR/LWIR domain, based on silicon, germanium, indium phosphide (InP) or chalcogenide semiconductor technologies or on discrete optical elements such as diffraction gratings or interference filters, placed upstream or downstream of the preamplifier, and/or wherein the set of at least one photodetector is a pair of balanced photodetectors;

the uplink transmission chain comprises an optical transmitter in the SWIR wavelength domain with external modulation or direct modulation, an erbium-doped fibre power optical amplifier EDFA, and optionally a wavelength multiplexer, placed upstream or downstream of the power amplifier, and a second telescope at the transmission end of the second uplink;

the first uplink conversion chain comprises a first electronic module for processing the demodulated data on the first uplink, connected between the uplink reception chain and the uplink transmission chain, optionally for decoding, correcting bit errors and re-encoding these data;

the relay platform comprises a second downlink conversion chain having: a downlink reception chain, configured so as to receive, in the SWIR domain, the third optical signal on the third downlink, optionally amplify and/or optionally wavelength-demultiplex the received first optical signal, detect and demodulate the amplified and demultiplexed signal into demodulated data; a downlink transmission chain, configured so as to transmit, amplify and optionally multiplex, in the MWIR/LWIR domain, the fourth optical signal on the fourth downlink, modulated by the demodulated data on the third downlink, coded or without interlacing or uncoded;

the downlink reception chain in the SWIR domain comprises
a third telescope at the reception end of the third downlink,
a low-noise optical preamplifier, notably an erbium-doped fibre amplifier EDFA, optionally a wavelength demultiplexer in the SWIR domain,
a downlink detection and demodulation chain contained in the set formed by a direct detection photoreceiver, an optical demodulator and a photoreceiver placed in series, and a coherent receiver comprising a local oscillator and a 90° hybrid followed by a pair of balanced photoreceivers;

the downlink transmission chain comprises an optical transmitter in the MWIR/LWIR wavelength domain with direct or external modulation, one or more power semiconductor optical amplifiers SOA,
optionally a wavelength multiplexer, based on silicon, germanium, indium phosphide (InP) or chalcogenide semiconductor technologies or on discrete optical elements such as diffraction gratings or interference filters, and a fourth telescope at the transmission end of the fourth downlink;

the optical transmitter of the downlink transmission chain has external modulation, operates in the MWIR/LWIR wavelength domain and comprises a QCL laser with external modulation, modulated by a phase or amplitude or amplitude and phase modulator, contained in the set formed by electro-absorption modulators EAM and Mach-Zehnder modulators MZM;

the optical transmitter of the downlink transmission chain comprises a QCL laser with external modulation, modulated by a phase or amplitude or amplitude and phase modulator, contained in the set formed by electro-absorption modulators EAM and Mach-Zehnder modulators MZM, preferably an MZM modulator;

the second downlink conversion chain comprises a second electronic module for processing the demodulated data on the third downlink, connected between the downlink reception chain and the downlink transmission chain, optionally for decoding, correcting bit errors and re-encoding these data;

the first terminal comprises an additional transmitter and receiver, configured so as to receive from or transmit to the second terminal data in direct free space optical mode without using the relay platform, and the relay platform is configured so as to activate the first and second uplinks and/or the third and fourth downlinks when the direct data transmission between the first terminal and the second terminal is persistently interrupted by sources of atmospheric interference.

Another subject of the invention is a relay platform for retransmitting data in free space optical FSO mode between a first ground or aeronautical optical transmission terminal and a second optical transmission terminal housed on board a satellite, the relay platform being configured so as to serve as a regenerator relay for transmitting data:

between a first uplink transmission link from the first terminal to the relay platform, and a second uplink data transmission link from the relay platform to the second transmission terminal, and/or between a third downlink transmission link from the second terminal to the relay platform, and a fourth downlink transmission link from the relay platform to the first terminal; and the relay platform being able to move at an altitude higher than that of atmospheric turbulence.

The relay platform is characterized in that it is configured so as to: receive the data transmitted by the first terminal, carried by a first optical signal on the first uplink that uses a first wavelength in the MWIR/LWIR domain of long wave infrared LWIR wavelengths, between 8 and 12 µm and/or medium wave MWIR wavelengths, between 3 and 5 µm, and transmit the received data on a second optical signal carrying the second uplink that uses a second wavelength in the domain of short wave infrared SWIR wavelengths; and/or receive the data transmitted by the second terminal, carried by a third optical signal on the third downlink that uses a third wavelength in the domain of short wave infrared SWIR wavelengths, and transmit the received data on a fourth optical signal carrying the fourth downlink that uses a fourth wavelength in the MWIR/LWIR domain of long wave infrared LWIR wavelengths and/or medium wave MWIR wavelengths.

According to particular embodiments, the relay platform comprises one or more of the following features, taken alone or in combination: the relay platform is configured so as to move at an altitude in the stratosphere or beyond; and/or the relay platform is contained in the set formed by stratospheric dirigibles, medium-altitude or high-altitude drones and satellites moving over a low Earth orbit LEO; and/or the relay platform comprises a first uplink conversion chain having an uplink reception chain, configured so as to receive, in the MWIR/LWIR domain, the first optical signal on the first uplink, optionally amplify and/or optionally wavelength-demultiplex the received first optical signal, detect and demodulate the optionally amplified and/or optionally demultiplexed signal into demodulated data; and an uplink transmission chain, configured so as to transmit, amplify and optionally multiplex, in the SWIR domain, the second optical signal on the second uplink, modulated by the demodulated data on the first uplink, coded with or without interlacing or uncoded; and/or the platform comprises a second downlink conversion chain having a downlink reception chain, configured so as to receive, in the SWIR domain, the third optical signal on the third downlink, optionally amplify and/or optionally wavelength-demultiplex the received first optical signal, detect and demodulate the optionally amplified and/or optionally demultiplexed signal into demodulated data; and a downlink transmission chain, configured so as to transmit, amplify and optionally multiplex, in the MWIR/LWIR domain, the fourth optical signal on the fourth downlink, modulated by the demodulated data on the third downlink, coded with or without interlacing or uncoded.

BRIEF DESCRIPTION OF THE DRAWINGS

The invention will be better understood on reading the following description of several embodiments, given solely by way of example and with reference to the drawings, in which.

DETAILED DESCRIPTION

The invention is based on a relay platform for links between a satellite, located in an environment not subject to interference, and an optical ground station located in an environment subject to interference by clouds, fog and/or atmospheric turbulence, the relay platform forming an interface for optically converting signals received in the near infrared, typically at a wavelength equal to 1.55 µm, to the far infrared, typically at a wavelength equal to 10 µm.

Wavelengths in the LWIR far infrared domain are less sensitive to atmospheric interference, in particular to Rayleigh and Mie scattering and to scintillation, and using them, at a low cost, reduces the frequency and the duration of the interruptions to a transmission link subjected to interference by clouds and atmospheric turbulence.

This platform solution, when implemented, takes advantage of the benefits offered by semiconductor materials and in particular the possibility of integrating photonic components (laser, modulator, etc.), which make it possible to save in terms of mass and volume.

Ocular safety is also improved by using a higher wavelength.

Figure 1:
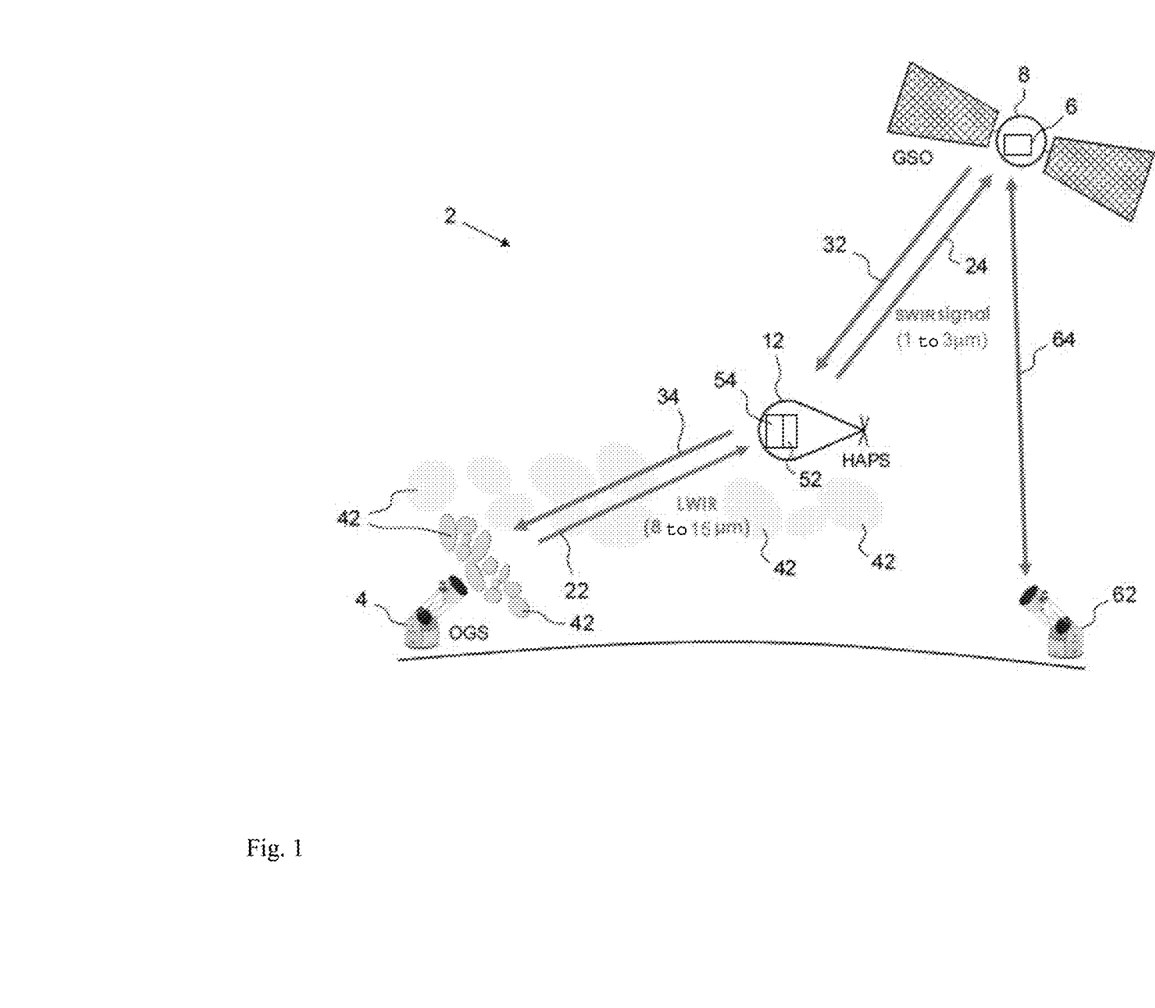
FIG. 1 is a view of the architecture of a first embodiment of a free space optical FSO space data transmission system according to the invention.

According to FIG. 1 and according to the invention, a free space optical FSO space data transmission system 2 comprises a first ground or aeronautical free space optical FSO data transmission terminal 4, and a second free space optical FSO data transmission terminal 6, housed on board a satellite 8.

The space transmission system 2 according to the invention also comprises a relay platform 12, located between the first transmission terminal 4 and the second transmission terminal 6.

The relay platform 12 is configured so as to serve as a regenerator relay for transmitting data between a first uplink transmission link 22 from the first terminal 4 to the relay platform 12, and a second uplink transmission link 24 from the relay platform 12 to the second transmission terminal 6.

The relay platform 12 is also configured so as to serve as a regenerator relay for transmitting data between a third downlink transmission link 32 from the second terminal 6 to the relay platform 12, and a fourth downlink transmission link 34 from the relay platform 12 to the first terminal 4.

The relay platform 12 is configured so as to move at an altitude higher than that of clouds and/or atmospheric turbulence 42.

The relay platform 12 is configured so as to receive the data transmitted by the first terminal 4, carried by a first optical signal on the first uplink 22 that uses a first wavelength in the domain of long wave infrared LWIR wavelengths, and transmit the received data on a second optical signal carrying the second uplink 24 that uses a second wavelength in domain of short wave infrared SWIR wavelengths.

The relay platform 12 is configured so as to receive the data transmitted by the second terminal 6, carried by a third optical signal on the third downlink 32 that uses a third wavelength in the domain of short wave infrared SWIR wavelengths, and transmit the received data on a fourth optical signal carrying the fourth downlink 34 that uses a fourth wavelength in the domain of long wave infrared LWIR wavelengths.

The relay platform 12 in this case comprises a first uplink conversion chain 52 and a second downlink conversion chain 54.

According to FIG. 1 and more specifically, the first terminal 4 is an optical ground station (OGS), the relay platform 12 is a stratospheric dirigible HAPS ("high-altitude platform system/station"), and the satellite 8 housing the second terminal 6 is a geostationary satellite GSO.

Generally speaking, the altitude of the relay platform is in the stratosphere or beyond, and the relay platform is a dirigible or a drone moving in the stratosphere or a satellite moving over a low Earth orbit (LEO).

Generally speaking, the first ground or aeronautical terminal is contained in the set formed by ground stations, ships, and aircraft such as drones, planes and helicopters.

Generally speaking, the second space terminal is housed on board a satellite moving over a geostationary orbit GSO or a medium-altitude orbit MEO or a low-altitude orbit LEO.

Advantageously, the relay platform 12 of the space transmission system 2 makes it possible to increase the availability and the capacity of a transmission on the uplinks and/or downlinks between the first terminal and the second terminal. Implementation thereof is simple and involves little effort.

More generally speaking, the first optical signal on the first uplink may use a first wavelength in the MWIR/LWIR domain of long wave infrared LWIR wavelengths, between 8 and 12 µm and/or medium wave MWIR wavelengths, between 3 µm and 5 µm.

More generally speaking, the fourth optical signal on the fourth downlink 34 may use a first wavelength in the MWIR/LWIR domain of long wave infrared LWIR wavelengths, between 8 and 12 µm and/or medium wave MWIR wavelengths, between 3 µm and 5 µm.

Advantageously, the portion of the space transmission system that is located outside the environment subject to interference is transparent.

In addition, since the technological components are made from semiconductor materials, photonic solutions that are integrated, and therefore more lightweight and more compact, may be used to produce the uplink and downlink chains of the relay platform.

It should also be noted that wavelengths in the far infrared LWIR and in the medium infrared MWIR domain are also less dangerous from an ocular point of view.

Figure 5:
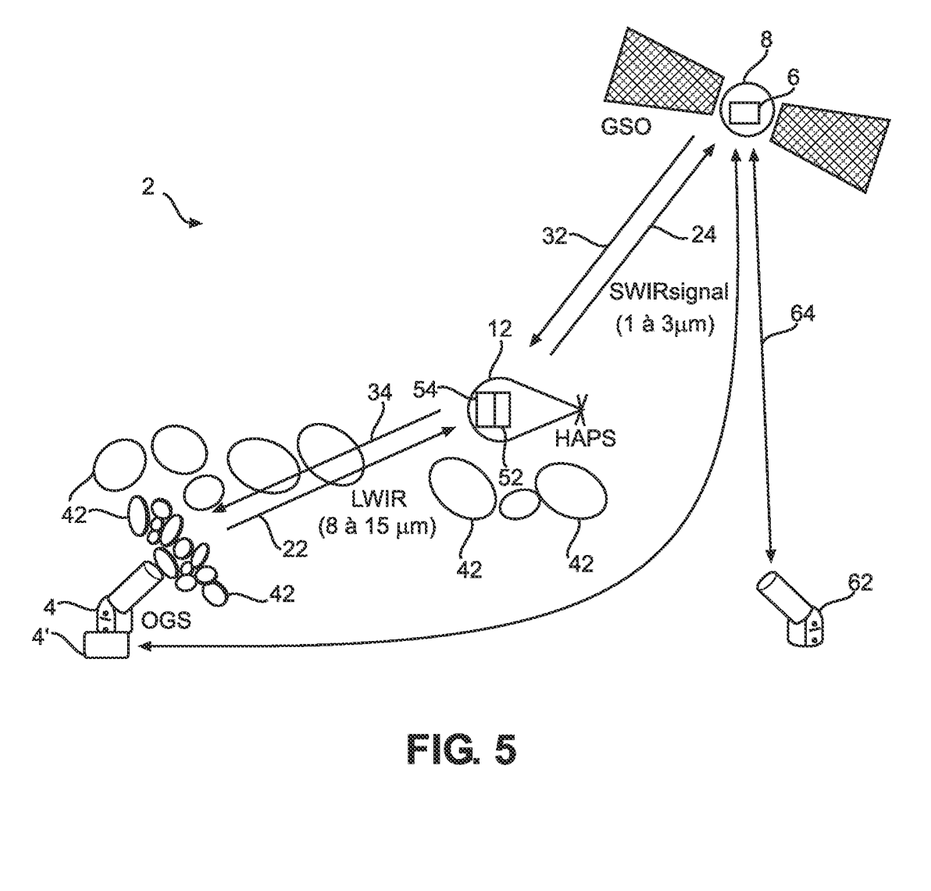
FIG. 5 is a view of the architecture of FIG. 1 having an additional transmitter and receiver.

In addition, the first terminal 4 comprises an additional transmitter and receiver 4', not shown in FIG. 1 but shown in FIG. 5, and configured so as to receive from or transmit to the second terminal data in direct free space optical mode in the near infrared wavelength domain without using the relay platform 12.

The relay platform 12 is configured so as to activate the first and second uplinks and/or the third and fourth downlinks when the direct data transmission between the first terminal and the second terminal is interrupted persistently by sources of atmospheric interference.

By way of example, a second first optical terminal 62 is illustrated in FIG. 1 in direct communication with the second terminal 6 of the satellite 8 on a bidirectional link 64 operating in the short wave infrared SWIR wavelength domain.

When the weather is clear, the transmission is direct with maximum capacity. In the event of interference, the transmission continues in the far infrared LWIR domain, typically at 10 μm, via the relay platform 12, with a possibly reduced transmission capacity.

Figure 2:
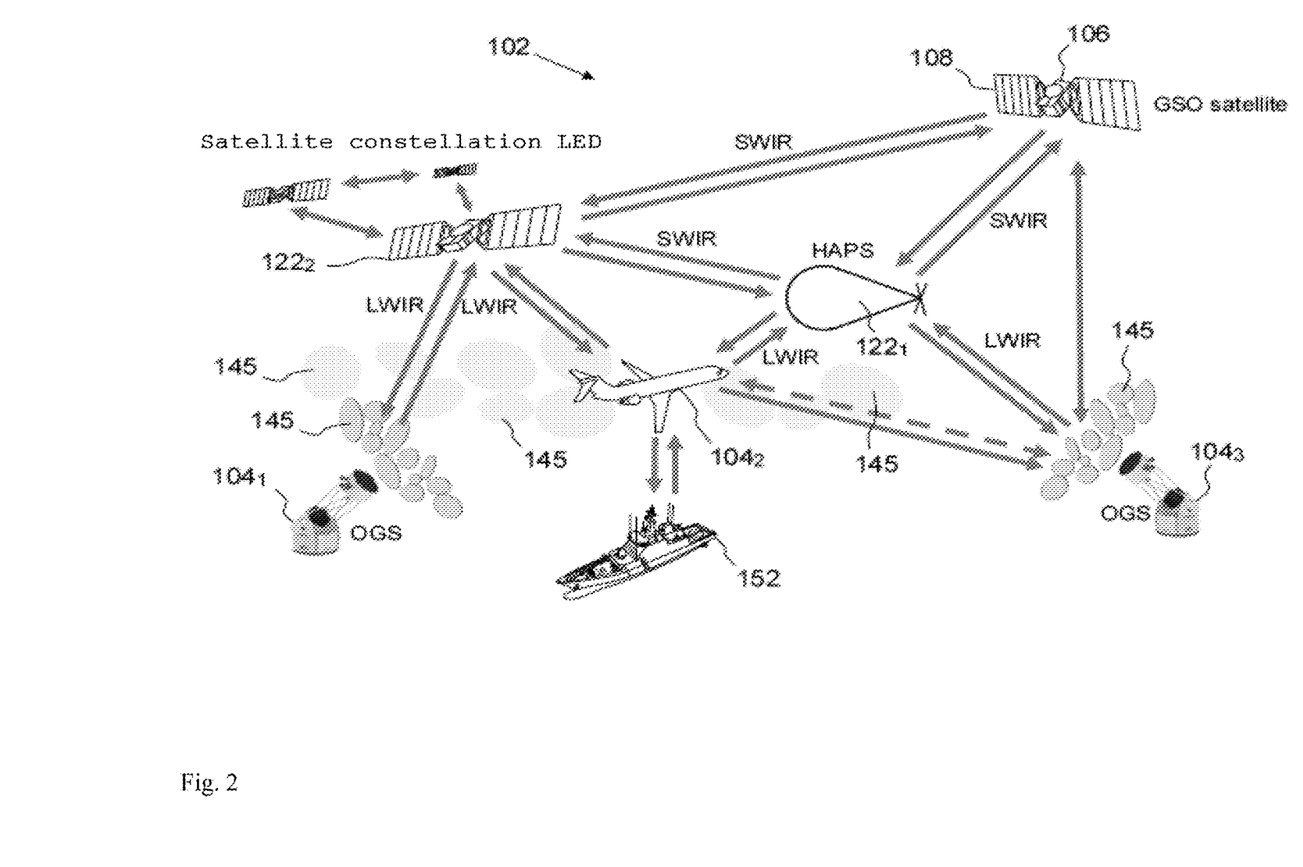
FIG. 2 is a view of the architecture of a second embodiment, more complex than the first embodiment, of a free space optical FSO space data transmission system according to the invention.

According to FIG. 2 and a second embodiment, a free space optical FSO space data transmission system 102 comprises:
- a set of first free space optical FSO data transmission terminals $104_1$, $104_2$, $104_3$, formed respectively by a first optical ground station OGS located to the left in FIG. 2, a plane, and a second optical ground station located to the right in FIG. 2; and
- a second free space optical FSO data transmission terminal 106, housed here on board a geostationary satellite GSO 108.

The space transmission system 102 according to the invention also comprises a set of two relay platforms $122_1$, $122_2$, formed respectively by a high-altitude platform HAPS and a low Earth orbit satellite LEO.

The first relay platform $122_1$ serves as a regenerator relay between the second optical ground station $104_3$ and the second terminal 106 housed on board the GSO satellite 108, and uses, for uplink reception and for downlink transmission, carriers in the far infrared LWIR domain if the corresponding first uplink and fourth downlink are degraded or interrupted due to blockage by clouds or turbulence 145.

The first relay platform $122_1$ also serves as a regenerator relay between the optical terminal $104_2$ housed on board the plane and the second terminal 106 housed on board the GSO satellite 108, and uses, for uplink reception and for downlink transmission, carriers in the far infrared LWIR domain if the corresponding first uplink and fourth downlink are degraded or interrupted due to blockage by clouds or turbulence 145.

The second relay platform $122_2$ serves as a regenerator relay between the first optical ground station $104_1$ and the second terminal 106 housed on board the GSO satellite 108, and uses, for uplink reception and for downlink transmission, carriers in the far infrared LWIR domain if the corresponding first uplink and fourth downlink are degraded or interrupted due to blockage by clouds or turbulence 145.

The second relay platform $122_2$ also serves as a regenerator relay between the optical terminal $104_2$ housed on board the plane and the second terminal 106 housed on board the GSO satellite 108, and uses, for uplink reception and for downlink transmission, carriers in the far infrared LWIR domain if the corresponding first uplink and fourth downlink are degraded or interrupted due to blockage by clouds or turbulence 145.

It should be noted that the plane on board which the first terminal $104_2$ is housed serves here as a relay to a marine transmission terminal 152 and to a second optical ground station GSO, but this relay is not a relay platform in the sense of the invention since it does not move above the atmosphere and any interference therein.

It should be noted that the use of the LWIR domain described in FIG. 2 is a preferred use, but this use may be expanded more generally to the MWIR/LWIR domain.

Figure 3:
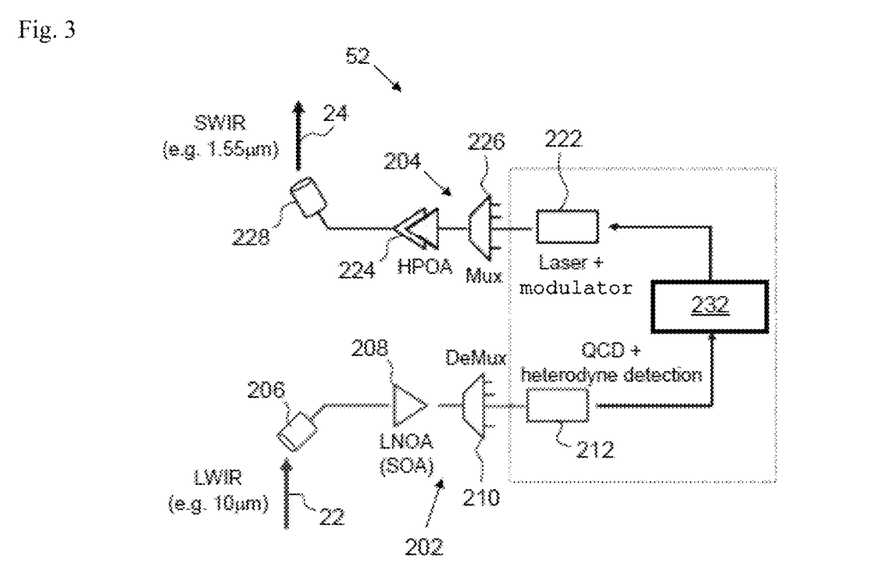
FIG. 3 is a view of one example of an architecture of a first uplink conversion chain of a relay platform according to the invention of a free space optical FSO space data transmission system, such as those described in FIGS. 1 and 2.

According to FIG. 3, the first uplink conversion chain 52 comprises an uplink reception chain 202 and an uplink transmission chain 204.

The uplink reception chain 202 is configured so as to receive, in the LWIR domain, the first optical signal on the first uplink 22, amplify and wavelength-demultiplex the received first optical signal, detect and demodulate the amplified and demultiplexed signal into demodulated data.

The uplink transmission chain 204 is configured so as to transmit, amplify and multiplex, in the SWIR domain, the second optical signal on the second uplink 24, modulated by the demodulated data on the first uplink, coded with or without interlacing or uncoded.

The uplink reception chain 202 comprises a first telescope 206 at the reception end of the first uplink 22, an LNOA (low-noise optical amplifier) low-noise semiconductor optical preamplifier SOA (semiconductor optical amplifier) 208, a wavelength demultiplexer 210 in the LWIR domain, and an uplink demodulation chain 212 with coherent detection using a heterodyne or homodyne beat.

The wavelength demultiplexer 210 in the LWIR domain is based on silicon, germanium, indium phosphide (InP) or chalcogenide semiconductor technologies or on discrete optical elements such as diffraction gratings or interference filters, and placed upstream or downstream of the preamplifier.

The uplink demodulation chain with coherent detection using a heterodyne or homodyne beat comprises a local oscillator and a 90° hybrid followed by a pair of balanced photodetectors based on photodetectors contained in the set of QWIP (quantum well infrared photodetectors) quantum-well photodetectors, QCD (quantum cascade detectors) quantum-well photodetectors, and photodetectors using materials from the set of materials MCT, HgCdTe (mercury cadmium telluride) and T2SL (InAs/Ga type-II superlattice).

The uplink transmission chain 204 comprises an optical transmitter 222 in the SWIR wavelength domain with external modulation, a power optical amplifier 224 HPOA (high-power optical amplifier) with an erbium-doped fibre amplifier (EDFA), a wavelength multiplexer 226, placed upstream or downstream of the power amplifier 224, and a second telescope 228 at the transmission end of the second uplink 24.

Furthermore, the first uplink conversion chain 52 comprises a first electronic module 232 for processing the demodulated data on the first uplink, connected between the uplink reception chain 202 and the uplink transmission chain 204.

As a variant, the low-noise optical preamplifier SOA 208 and/or the wavelength demultiplexer 210 may be omitted.

More generally speaking, the pair of balanced quantum-well photodetectors, QWIPs or QCDs, or using one of the materials from the set of materials MCT, HgCdTe (mercury cadmium telluride) and T2SL (InAs/GaS type-II superlattice) may be replaced with a set of one or more than two QWIP or QCD quantum-well photodetectors, or using one of the materials from the set of materials MCT, HgCdTe (mercury cadmium telluride) and T2SL (InAs/GaS type-II superlattice).

More generally speaking, the uplink reception chain 202 and its components are configured so as to operate in the MWIR/LWIR wavelength domain.

According to FIG. 3, the conversion is performed in two stages, with firstly the reception of the optical signal in a wavelength of the LWIR infrared domain and its conversion into an electronic signal by the photoreceiver 212. The electronic signal possibly undergoes signal processing and then, in a second stage, is converted back into an optical signal in another wavelength by virtue of a laser with external modulation.

The invention makes it possible to overcome the physical limits of near-infrared wavelengths while at the same time being integrated into systems that are currently used. It is also compatible and complementary with existing solutions. It has a moderate impact on the cost, the consumption and the volume of the overall system.

The relay could preferably be implemented between a ground station and a satellite GEO via a HAPS.

Figure 4:
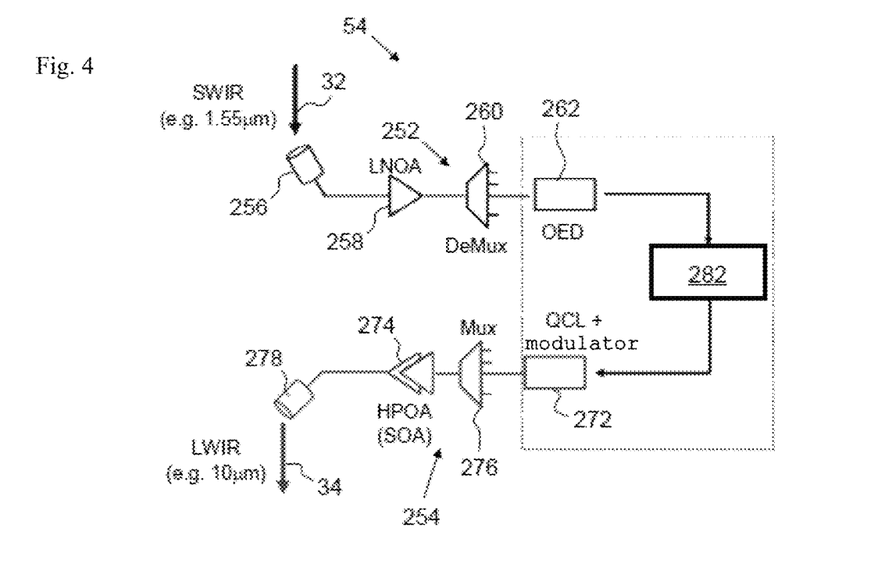
FIG. 4 is a view of one example of an architecture of a second downlink conversion chain of the relay platform of a free space optical FSO space data transmission system, such as those described in FIGS. 1 and 2.

According to FIG. 4, the second downlink conversion chain 54 comprises a downlink reception chain 252 and a downlink transmission chain 254.

The downlink reception chain 252 is configured so as to receive, in the SWIR wavelength domain, the third optical signal on the third downlink 32, amplify and wavelength-demultiplex the received first optical signal, detect and demodulate the amplified and demultiplexed signal into demodulated data.

The downlink transmission chain 252 is configured so as to transmit, amplify and multiplex, in the LWIR domain, the fourth optical signal on the fourth downlink 34, modulated by the demodulated data on the third downlink 32, coded with or without interlacing or uncoded.

The downlink reception chain 252 comprises a third telescope 256 at the reception end of the third downlink 32, a low-noise optical preamplifier 258 LNOA, notably an erbium-doped fibre amplifier EDFA, a wavelength demultiplexer 260 in the SWIR domain, and an uplink detection and demodulation chain 262.

The downlink detection and demodulation chain 262 is contained in the set formed by a direct detection photoreceiver, an optical demodulator and a photoreceiver placed in series, and a coherent receiver comprising a local oscillator and a 90° hybrid followed by a pair of balanced photoreceivers.

The downlink transmission chain 254 comprises an optical transmitter 272 in the LWIR wavelength domain based on a QCL laser integrated monolithically with a Mach-Zehnder modulator MZM, one or more power HPOA semiconductor optical amplifiers SOA 274, a wavelength multiplexer 276, and a fourth telescope at the transmission end 278 of the fourth downlink 34.

The wavelength multiplexer 276 is based on silicon, germanium, indium phosphide (InP) or chalcogenide semiconductor technologies or on discrete optical elements such as diffraction gratings or interference filters.

As a variant, the integration of the Mach-Zehnder modulator MZM may be discrete or hybrid.

As a variant, the optical transmitter 272 has direct modulation and uses a directly modulated laser.

As a variant, the Mach-Zehnder modulator MZM, which is one preferred embodiment, may be replaced with an electro-absorption modulator EAM, and more generally with a phase or amplitude or amplitude and phase modulator.

As a variant, the wavelength multiplexer 276 may be omitted.

More generally speaking, the downlink transmission chain 254 and its components are configured so as to operate in the MWIR/LWIR wavelength domain.

Furthermore, the second downlink conversion chain 54 comprises a second electronic module 282 for processing the demodulated data on the third downlink, connected between the downlink reception chain and the downlink transmission chain.

The industrial applications of the invention concern in particular any optical transmissions in a turbulent environment where one of the terminals is located in the turbulent environment.

The applications of the invention are varied and concern firstly high-capacity transmission uplinks. Medium-capacity transmission downlinks for observation from LEO/MEO satellites are also concerned.

The invention claimed is:

1. A free space optical FSO space data transmission system comprising:
   a first ground or aeronautical free space optical FSO data transmission terminal;
   a second free space optical FSO data transmission terminal housed on board a satellite;
   a relay platform, located between the first transmission terminal and the second transmission terminal, and configured to serve as a regenerator relay for transmitting data
   between a first uplink transmission link from the first terminal to the relay platform, and a second uplink data transmission link from the relay platform to the second transmission terminal, and/or
   between a third downlink transmission link from the second terminal to the relay platform, and a fourth downlink transmission link from the relay platform to the first terminal;
   the free space optical FSO space data transmission system being wherein
   the relay platform is configured to move at an altitude higher than that of clouds and atmospheric turbulence, and
   the relay platform is configured to
   receive the data transmitted by the first terminal, carried by a first optical signal on the first uplink that uses a first wavelength in the MWIR/LWIR domain of long wave infrared LWIR wavelengths, between 8 and 12 µm and/or medium wave MWIR wavelengths, between 3 and 5 µm, and transmit the received data on a second optical signal carrying the second uplink that uses a second wavelength in the domain of short wave infrared SWIR wavelengths; and/or
   receive the data transmitted by the second terminal, carried by a third optical signal on the third downlink that uses a third wavelength in the domain of short wave infrared SWIR wavelengths, and transmit the received data on a fourth optical signal carrying the fourth downlink that uses a fourth wavelength in the MWIR/LWIR domain of long wave infrared LWIR wavelengths and/or medium wave MWIR wavelengths, wherein the first terminal comprises an additional transmitter and receiver, configured to receive from or transmit to the second terminal data in direct free space optical mode without using the relay platform, and wherein the relay platform is configured to activate the first and second uplinks and/or the third and fourth downlinks when the direct data transmission between the first terminal and the second terminal is persistently interrupted by sources of atmospheric interference.

2. The free space optical FSO space data transmission system according to claim 1, wherein the altitude of the relay platform is in the stratosphere or beyond; and/or the relay platform is a dirigible or a drone moving in the stratosphere or a satellite moving over a low Earth orbit LEO.

3. The free space optical FSO space data transmission system according to claim 1, wherein the first ground or aeronautical terminal is contained in the set formed by ground stations, ships, and aircraft such as drones, planes and helicopters.

4. The free space optical FSO space data transmission system according to claim 1, wherein the second space terminal is housed on board a satellite moving over a geostationary orbit GEO or a medium-altitude orbit MEO or a low-altitude orbit LEO.

5. The free space optical FSO space data transmission system according to claim 1, wherein the relay platform comprises a first uplink conversion chain having an uplink reception chain, configured so as to receive, in the MWIR/LWIR domain, the first optical signal on the first uplink, detect and demodulate an amplified and demultiplexed signal into demodulated data;

an uplink transmission chain, configured to transmit, in the SWIR domain, the second optical signal on the second uplink, modulated by the demodulated data on the first uplink, coded with or without interlacing or uncoded.

6. The free space optical FSO space data transmission system according to claim 5, wherein the uplink reception chain comprises:

a first telescope at the reception end of the first uplink, an uplink demodulation chain with coherent detection using a heterodyne beat comprising a local oscillator and a 90° hybrid followed by an assembly of at least one photodetector contained in the set of QWIP quantum-well photodetectors, QCD quantum-well photodetectors, and photodetectors using materials from the set of materials MCT, HgCdTe (mercury cadmium telluride) and T2SL (InAs/Ga type-II superlattice).

7. The free space optical FSO space data transmission system according to claim 6, wherein the uplink reception chain furthermore comprises a low-noise semiconductor optical preamplifier SOA, and/or a wavelength demultiplexer in the MWIR/LWIR domain, based on silicon, germanium, indium phosphide (InP) or chalcogenide semiconductor technologies or on discrete optical elements such as diffraction gratings or interference filters, placed upstream or downstream of the preamplifier, and/or wherein the set of at least one photodetector is a pair of balanced photodetectors.

8. The free space optical FSO space data transmission system according to claim 5, wherein the uplink transmission chain comprises:

an optical transmitter in the SWIR wavelength domain with external modulation or direct modulation;

an erbium-doped fibre power optical amplifier EDFA; and a second telescope at the transmission end of the second uplink.

9. The free space optical FSO space data transmission system according to claim 5, wherein the first uplink conversion chain comprises a first electronic module for processing the demodulated data on the first uplink, connected between the uplink reception chain and the uplink transmission chain.

10. The free space optical FSO space data transmission system according to claim 1, wherein the relay platform comprises a second downlink conversion chain having:

a downlink reception chain, configured to receive, in the SWIR domain, the third optical signal on the third downlink, detect and demodulate an amplified and demultiplexed signal into demodulated data; and a downlink transmission chain, configured to transmit and amplify in the MWIR/LWIR domain, the fourth optical signal on the fourth downlink, modulated by the demodulated data on the third downlink, coded with or without interlacing or uncoded.

11. The free space optical FSO space data transmission system according to claim 10, wherein the downlink reception chain in the SWIR domain comprises:

a third telescope at the reception end of the third downlink; and a low-noise optical preamplifier, notably an erbium-doped fibre amplifier EDFA.

12. The free space optical FSO space data transmission system according to claim 10, wherein the downlink transmission chain comprises:

an optical transmitter in the MWIR/LWIR wavelength domain with direct or external modulation;

one or more power semiconductor optical amplifiers SOA; and a fourth telescope at the transmission end of the fourth downlink.

13. The free space optical FSO space data transmission system according to claim 12, wherein the optical transmitter of the downlink transmission chain has external modulation, operates in the MWIR/LWIR wavelength domain and comprises a QCL laser with external modulation, modulated by a phase or amplitude or amplitude and phase modulator, contained in the set formed by electro-absorption modulators EAM and Mach-Zehnder modulators MZM.

14. The free space optical FSO space data transmission system according to claim 13, wherein the optical transmitter of the downlink transmission chain comprises a QCL laser with external modulation, modulated by a phase or amplitude or amplitude and phase modulator, contained in the set formed by electro-absorption modulators EAM and Mach-Zehnder modulators MZM, preferably an MZM modulator.

15. The free space optical FSO space data transmission system according to claim 10, wherein the second downlink conversion chain comprises a second electronic module for processing the demodulated data on the third downlink, connected between the downlink reception chain and the downlink transmission chain.

16. A relay platform for retransmitting data in free space optical FSO mode between a first ground or aeronautical optical transmission terminal and a second optical transmission terminal housed on board a satellite,
the relay platform being configured to serve as a regenerator relay for transmitting data:
between a first uplink transmission link from the first terminal to the relay platform, and a second uplink data transmission link from the relay platform to the second transmission terminal, and/or
between a third downlink transmission link from the second terminal to the relay platform, and a fourth downlink transmission link from the relay platform to the first terminal; and
the relay platform being configured to move at an altitude higher than that of atmospheric turbulence,
the relay platform being configured to:
receive the data transmitted by the first terminal, carried by a first optical signal on the first uplink that uses a first wavelength in the MWIR/LWIR domain of long wave infrared LWIR wavelengths, between 8 and 12 µm and/or medium wave MWIR wavelengths, between 3 and 5 µm, and transmit the received data on a second optical signal carrying the second uplink that uses a second wavelength in the domain of short wave infrared SWIR wavelengths; and/or
receive the data transmitted by the second terminal, carried by a third optical signal on the third downlink that uses a third wavelength in the domain of short wave infrared SWIR wavelengths, and transmit the received data on a fourth optical signal carrying the fourth downlink that uses a fourth wavelength in the MWIR/LWIR domain of long wave infrared LWIR wavelengths and/or medium wave MWIR wavelengths,
wherein the first terminal comprises an additional transmitter and receiver, configured to receive from or transmit to the second terminal data in direct free space optical mode without using the relay platform, and
wherein the relay platform is configured to activate the first and second uplinks and/or the third and fourth downlinks when the direct data transmission between the first terminal and the second terminal is persistently interrupted by sources of atmospheric interference.

17. The relay platform according to claim 16,
configured to move at an altitude in the stratosphere or beyond; and/or
contained in the set formed by stratospheric dirigibles, medium-altitude or high-altitude drones and satellites moving over a low Earth orbit LEO; and/or
comprising a first uplink conversion chain having
an uplink reception chain, configured to receive, in the MWIR/LWIR domain, the first optical signal on the first uplink, detect and demodulate the signal into demodulated data; and
an uplink transmission chain, configured to transmit and amplify in the SWIR domain, the second optical signal on the second uplink, modulated by the demodulated data from the first uplink, coded with or without interlacing or uncoded; and/or
comprising a second downlink conversion chain having
a downlink reception chain, configured to receive, in the SWIR domain, the third optical signal on the third downlink, detect and demodulate the signal into demodulated data; and
a downlink transmission chain, configured to transmit and amplify, in the MWIR/LWIR domain, the fourth optical signal on the fourth downlink, modulated by the demodulated data on the third downlink, coded with or without interlacing or uncoded.

* * * * *